No. 644,920. Patented Mar. 6, 1900.
C. W. INGRAM.
SEED PLANTER.
(Application filed Jan. 11, 1900.)
(No Model.) 3 Sheets—Sheet 2.
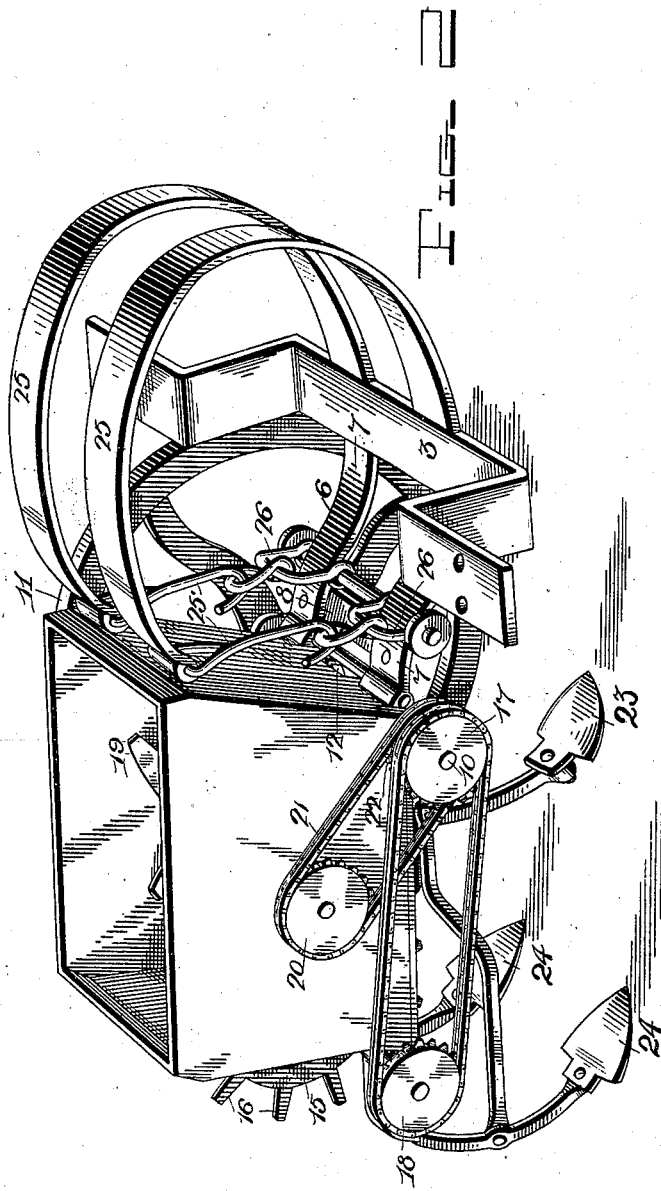

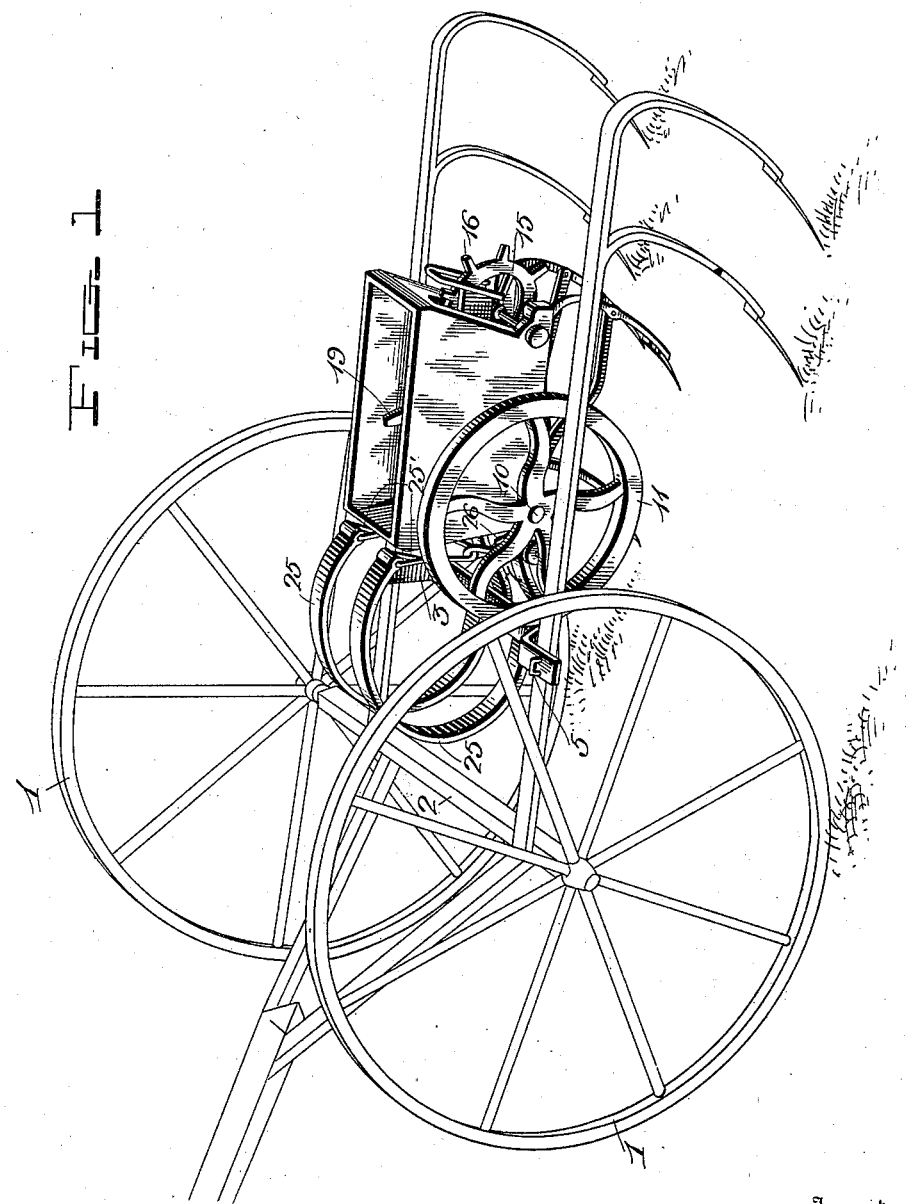

No. 644,920. Patented Mar. 6, 1900.
C. W. INGRAM.
SEED PLANTER.
(Application filed Jan. 11, 1900.)
(No Model.) 3 Sheets—Sheet 3.
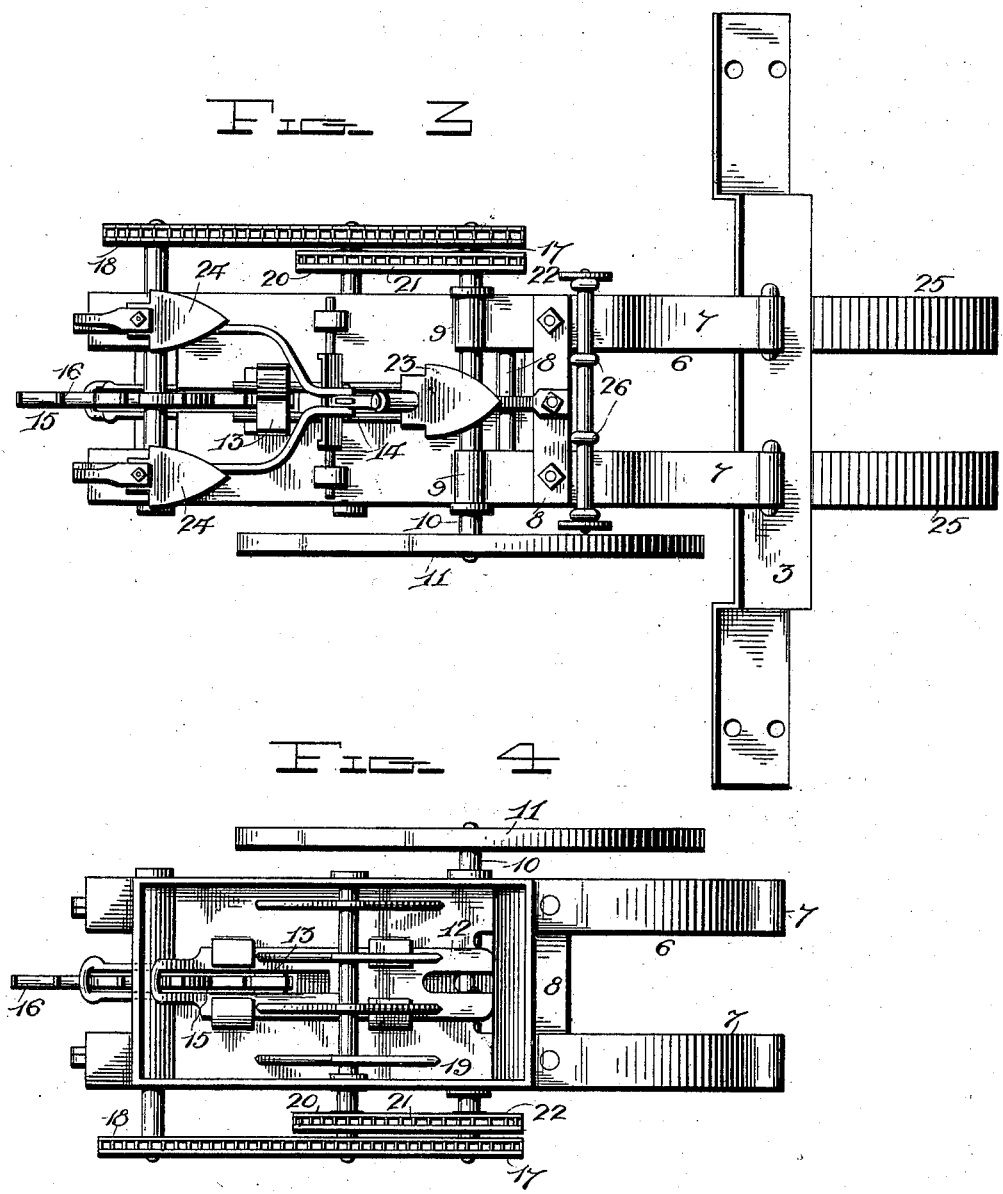

UNITED STATES PATENT OFFICE.

CHARLES W. INGRAM, OF BRUCEVILLE, TEXAS.

SEED-PLANTER.

SPECIFICATION forming part of Letters Patent No. 644,920, dated March 6, 1900.

Application filed January 11, 1900. Serial No. 1,112. (No model.)

*To all whom it may concern:*

Be it known that I, CHARLES W. INGRAM, a citizen of the United States, residing at Bruceville, in the county of McLennan and State of Texas, have invented certain new and useful Improvements in Seed-Planters; and I do declare the following to be a full, clear, and exact description of the invention, such as will enable others skilled in the art to which it appertains to make and use the same.

The invention relates to seed-planters.

The object of the invention is to provide a planter attachment which may be connected with the ordinary wheel-cultivator and which may be used as a planter or as a replanter—that is to say, it may be used in originally planting a field and then when the field is being cultivated should there be any barren places the planter attachment may be brought into action during the cultivation of the ground and replant the barren places.

To this end the invention consists in certain features of construction and combination of parts, which will be hereinafter fully described and claimed.

In the accompanying drawings, Figure 1 is a perspective view illustrating my invention attached to a wheel-cultivator. Fig. 2 is an enlarged detail perspective view of the seedbox-supporting frame. Fig. 3 is a bottom plan view. Fig. 4 is a top plan view of the seedbox.

In the drawings the same reference characters indicate the same parts of the invention.

1 denotes a wheel-cultivator, which may be of any well-known or approved construction, and 2 its axle.

3 denotes a supporting-bar secured to the cultivator-beams by clips 5.

6 denotes the seedbox-supporting frame, which consists of the longitudinal strips 7, the forward ends of which are hinged to the lower side of the cross-bar 3. These strips are connected together by cross-pieces 8 and are provided with bearings 9 for the axle 10 of a traction-wheel 11.

12 denotes a slide-valve located within the bottom of the seedbox and by means of which the discharge of seed may be regulated.

13 denotes a seed-discharge throat consisting of two curved strips pivoted to the bottom of the seed-hopper at the side of the opening therein and held toward each other by spring-arms 14.

15 denotes a rotary seed-wheel having fingers 16, which in passing through the slot in the bottom of the hopper force the seed through said slot and out from between the throat-pieces and allow the seed to fall to the ground.

The axle 10 of the traction-wheel is provided with a sprocket-wheel 17, which is geared to the sprocket-wheel 18, fixed to the axle of the seed-wheel.

19 denotes a seed-stirrer the shaft of which is journaled in the side of the seedbox and provided with a sprocket-wheel 20, which is connected by a sprocket-chain 21 to a sprocket-wheel 22, secured to the axle 10.

23 denotes a furrow-opener, and 24 24 denote seed-coverers.

25 denotes two bowed springs, the lower ends of which are fixedly secured to the cross-bar 3 and the upper ends of which are bowed rearwardly and provided with hinged hooks 25', which engage shackles 26, connected to the forward end of the seedbox-supporting frame immediately in advance of the seedbox.

When the device is used as an ordinary planter, the hooks of the bowed springs are disengaged from the shackles, thus permitting the seedbox, with its mechanism, to lower into engagement with the ground. As it is drawn along, the traction-wheel will operate the seed-discharging mechanism, and the seed will be thus planted. When the hooks are engaged with the shackles, the tension of the springs will elevate the traction-wheel from engagement with the ground, so that the machine may be driven along and used as a cultivator. Here and there barren places will appear during the cultivation of growing plants, and the operator by pressing his foot down upon the seedbox will lower the traction-wheel into engagement with the ground, thus replanting the barren places. When his foot is removed from the seedbox, the springs will return it to its normal position, with its traction-wheel elevated above the ground. It will thus be seen that the machine may be used, first, as a seed-planter; second, as a cultivator, and, third, as a replanter.

From the foregoing description, taken in connection with the accompanying drawings, the construction, operation, and advantages of my improved seed-planter will be readily apparent without requiring an extended explanation.

It will be seen that my invention is simple of construction, that said construction permits of its manufacture at small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

1. The combination with a cultivator; of a seedbox-supporting frame having a hinged connection therewith, a seedbox, and discharge mechanism therefor, and springs connected to the seedbox and exerting their energy to elevate the same to raise its discharge mechanism from engagement with the ground, substantially as and for the purpose set forth.

2. The combination with a cross-bar adapted to be secured to the beams of a cultivator; of a seedbox provided with dropping mechanism, a seedbox-supporting frame to which the seedbox is connected, said supporting-frame being hinged to the cross-bar, and springs secured to the cross-bar and having one set of ends removably engaged with the said supporting-frame, substantially as and for the purpose set forth.

In testimony whereof I have hereunto set my hand in presence of two subscribing witnesses.

CHARLES W. INGRAM.

Witnesses:
GEO. T. COX,
J. H. SHELTON.